US012569951B2

(12) United States Patent
Aguilar et al.

(10) Patent No.: US 12,569,951 B2
(45) Date of Patent: Mar. 10, 2026

(54) CENTERING MECHANISMS FOR PRECISION ALIGNMENT OF A COMPONENT OR WARE

(71) Applicant: CORNING INCORPORATED, Corning, NY (US)

(72) Inventors: Alejandro Aguilar, Painted Post, NY (US); Kevin Eugene Elliott, Newton, NC (US)

(73) Assignee: CORNING INCORPORATED, Corning, NY (US)

( * ) Notice: Subject to any disclaimer, the term of this patent is extended or adjusted under 35 U.S.C. 154(b) by 556 days.

(21) Appl. No.: 17/983,825

(22) Filed: Nov. 9, 2022

(65) Prior Publication Data

US 2023/0161318 A1      May 25, 2023

Related U.S. Application Data

(60) Provisional application No. 63/347,204, filed on May 31, 2022, provisional application No. 63/282,805, filed on Nov. 24, 2021.

(51) Int. Cl.
B23Q 3/18          (2006.01)
G05B 19/402          (2006.01)

(52) U.S. Cl.
CPC .......... B23Q 3/183 (2013.01); G05B 19/402 (2013.01); G05B 2219/50047 (2013.01); Y10T 82/2597 (2015.01)

(58) Field of Classification Search
CPC ............... B23B 31/16; B23B 2260/116; B23B 2231/22; B23B 31/102; Y10T 279/1986; Y10T 279/19; Y10T 82/2597; B23Q 1/76; B23Q 3/16; B23Q 3/18; B23Q 3/183
USPC ..................... 279/110, 123, 66, 133; 269/309
See application file for complete search history.

(56) References Cited

U.S. PATENT DOCUMENTS

| | | | |
|---|---|---|---|
| 5,915,678 A | 6/1999 | Slocum et al. | |
| 6,659,261 B2 | 12/2003 | Miyakawa et al. | |
| 6,672,185 B1 * | 1/2004 | Behnke .................... | B23Q 1/76 |
| | | | 82/162 |
| 9,283,658 B2 | 3/2016 | Marple et al. | |
| 12,269,138 B2 * | 4/2025 | Aguilar .................... | B23Q 1/76 |
| 2004/0237734 A1 * | 12/2004 | Lessway ............ | B23Q 11/0032 |
| | | | 82/163 |
| 2010/0101298 A1 * | 4/2010 | Carstensen .............. | B21J 13/10 |
| | | | 269/71 |

* cited by examiner

*Primary Examiner* — Katina N. Henson
*Assistant Examiner* — Sharonda T Felton
(74) *Attorney, Agent, or Firm* — Kevin M. Able

(57)          ABSTRACT

Centering apparatuses and methods for precision placement of a product or component, such as a ceramic honeycomb body, prior to a post-production processing steps are provided. In particular, after extrusion of a component or ware, the component or ware oftentimes requires one or more post-production processing steps in order to obtain a final product. The centering apparatuses and methods described herein provide for the precise and accurate centering of the product (or component) prior to performing these post-production processing steps, thereby obtaining repeatable, consistent, high-quality final products.

14 Claims, 8 Drawing Sheets

800

810 → APPROXIMATELY PLACE WARE ON A BASE

820 → ACTUATE CENTERING APPARATUS TO POSITION MOVEABLE ARMS

830 → ENGAGE SURFACE OF WARE USING MULTIPLE SETS OF FOLLOWERS

840 → ACTUATE THE MOVEABLE ARMS TO ALIGN THE WARE WITH A CENTRAL AXIS

850 → PERFORM ONE OR MORE MANUFACTURING PROCESSES ON THE CENTERED WARE

CENTERING MECHANISMS FOR PRECISION ALIGNMENT OF A COMPONENT OR WARE

CROSS REFERENCE TO RELATED APPLICATION

This application claims the benefit of priority under 35 U.S.C. § 119 of U.S. Provisional Application Ser. No. 63/347,204 filed on May 31, 2022 and U.S. Provisional Application Ser. No. 63/282,805 filed on Nov. 24, 2021, the content of which is relied upon and incorporated herein by reference in its entirety.

FIELD OF THE DISCLOSURE

The present disclosure is directed generally to precision placement systems, and more specifically to systems and methods for precisely centering components and/or wares relative to an associated manufacturing processing machine.

BACKGROUND

During manufacturing, a component or part may need to undergo one or more processing steps in order to obtain an intermediate or final product. Thus, the component or part may need to be removed from one processing system and placed in one or more other processing systems. For example, when manufacturing ceramic honeycomb bodies (such as filters and substrates used in exhaust systems) using an extrude-to-shape process, the extruded part may be removed from the extrusion system and placed into one or more additional processing systems for edge beveling, component coating, or other post-production processing. However, if the extruded component or part is not precisely positioned or aligned within the one or more additional processing systems, it will be difficult to consistently produce high-quality final products.

SUMMARY OF THE DISCLOSURE

The present disclosure relates to apparatuses for precision alignment of a component or ware and methods of centering such components or wares.

According to an embodiment, a centering apparatus for centering a ware is provided. The centering apparatus can comprise: at least three moveable arms configured to be positioned around a central axis of an associated processing system; at least three rotatable supports, each rotatable support being secured to one of the at least three moveable arms, wherein each rotatable support has a rotation axis and is configured to rotate about the corresponding rotation axis; and a plurality of followers, each follower being mounted to one of the at least three rotatable supports.

In an aspect, each follower of the plurality of followers has a spinning axis and is configured to rotate about the corresponding spinning axis. In a further aspect, the rotation axes for at least two of the rotatable supports are parallel to the central axis of the associated processing system.

In an aspect, the at least three moveable arms are configured to be positioned at equidistant points around the central axis of the associated processing system.

In an aspect, each moveable arm is configured to be actuated radially around the central axis of the associated processing system.

In an aspect, at least two followers are mounted to each of the rotatable supports.

In an aspect, for each of the rotatable supports: a first follower is secured to a corresponding rotatable support and has a spinning axis that is a first xy-distance from the rotation axis of the corresponding rotatable support; a second follower is secured to the corresponding rotatable support has a spinning axis that is a second xy-distance from the rotation axis of the corresponding rotatable support; and the first xy-distance is equal to the second xy-distance.

In an aspect, each of the rotatable supports are configured to be adjustable such that the first xy-distance and the second xy-distance can be increased or decreased.

In an aspect, each of the plurality of followers are radiused, beveled, and/or tapered to enable a single point of contact with a surface of the ware.

In an aspect, each moveable arm of the at least three moveable arms is configured to be actuated linearly along a path between the moveable arm and the central axis of the associated processing system.

In an aspect, each of the rotatable supports has a mobility about the corresponding rotation axis of between about 1° and about 90°.

In an aspect, each of the plurality of followers has a mobility about the corresponding spinning axis of at least about 180°.

In an aspect, each of the plurality of followers has a mobility about the corresponding spinning axis that is unconstrained.

In an aspect, the spinning axis for each of the plurality of followers is parallel to the central axis of the associated processing system.

In an aspect, the plurality of followers and the at least three moveable arms are configured to constrain movement of the ware when centered in three degrees of freedom, wherein the three degrees of freedom comprise translation in an x-axis direction, translation in a y-axis direction, and rotation about a z-axis direction.

In an aspect, the at least three moveable arms are coupled together and connected to a mount for supporting the ware for centering.

According to another embodiment, a method of processing a ware is provided, comprising: centering the ware on a base of a mount using a centering apparatus; and performing, using at least the associated processing system, one or more manufacturing processes on the centered ware. In an aspect, the centering apparatus comprises: at least three moveable arms configured to be positioned around a central axis of an associated processing system; at least three rotatable supports, each rotatable support being secured to one of the at least three moveable arms, wherein each rotatable support has a rotation axis and is configured to rotate about the corresponding rotation axis; and a plurality of followers, each follower being mounted to one of the at least three rotatable supports, wherein each follower of the plurality of followers has a spinning axis and is configured to rotate about the corresponding spinning axis.

In an aspect, one or more manufacturing processes comprises edge beveling the centered ware.

According to yet another embodiment, a method of centering a ware in a processing system is provided, the method comprising: placing the ware on a base of the processing system, the base having a planar surface for supporting the ware; actuating a centering apparatus to position at least three moveable arms of the centering apparatus around a central axis of the processing system; engaging, by a first set of followers, a first surface portion of the ware, wherein the first set of followers are mounted to a first rotatable support that is secured to a first moveable arm of the at least three moveable arms; engaging, by a second set of followers, a second surface portion of the ware, wherein the second set of followers are mounted to a second rotatable support that is secured to a second moveable arm of the at least three moveable arms; engaging, by a third set of followers, a third surface portion of the ware, wherein the third set of followers are mounted to a third rotatable support that is secured to a third moveable arm of the at least three moveable arms; and actuating the at least three moveable arms and the first, second, and third sets of followers to align a ware axis with the central axis of the processing system.

In an aspect, the at least three moveable arms are actuated to be positioned at equidistant points around the central axis of the associated processing system.

In an aspect, the first, second, and third sets of followers each comprise exactly two followers, each follower having a spinning axis that is at least a first xy-distance from the rotation axis of the corresponding rotatable support, and the method further comprises: actuating the first, second, and third rotatable supports such that at least the first xy-distance for each follower is increased or decreased to at least a second xy-distance, the second xy-distance being different from at least the first xy-distance.

In an aspect, engaging the first, second, and third surface portions of the ware with the first, second, and third sets of followers comprises contacting each follower of the first, second, and third sets of followers with the first, second, and third surface portions of the ware at a plurality of single points of contact.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure provides systems, apparatuses, and methods for precision alignment of a product, part, component, or ware prior to performing one or more post-production processing steps. The disclosed systems, apparatuses, and methods utilize the constrained and unconstrained mechanical motion of various parts in order to automatically and precisely align the products, parts, components, and wares within an associated processing system. The described centering systems and apparatuses can be integrated into one or more processing systems or can be independent and modular such a centering system or apparatus can be used with multiple processing systems. As such, the systems, apparatuses, and methods described herein can improve the repeatability and consistency of subsequent processing steps, reducing variations between resulting products and ultimately reducing wear and maintenance needed for the associated processing systems.

Figure 1:
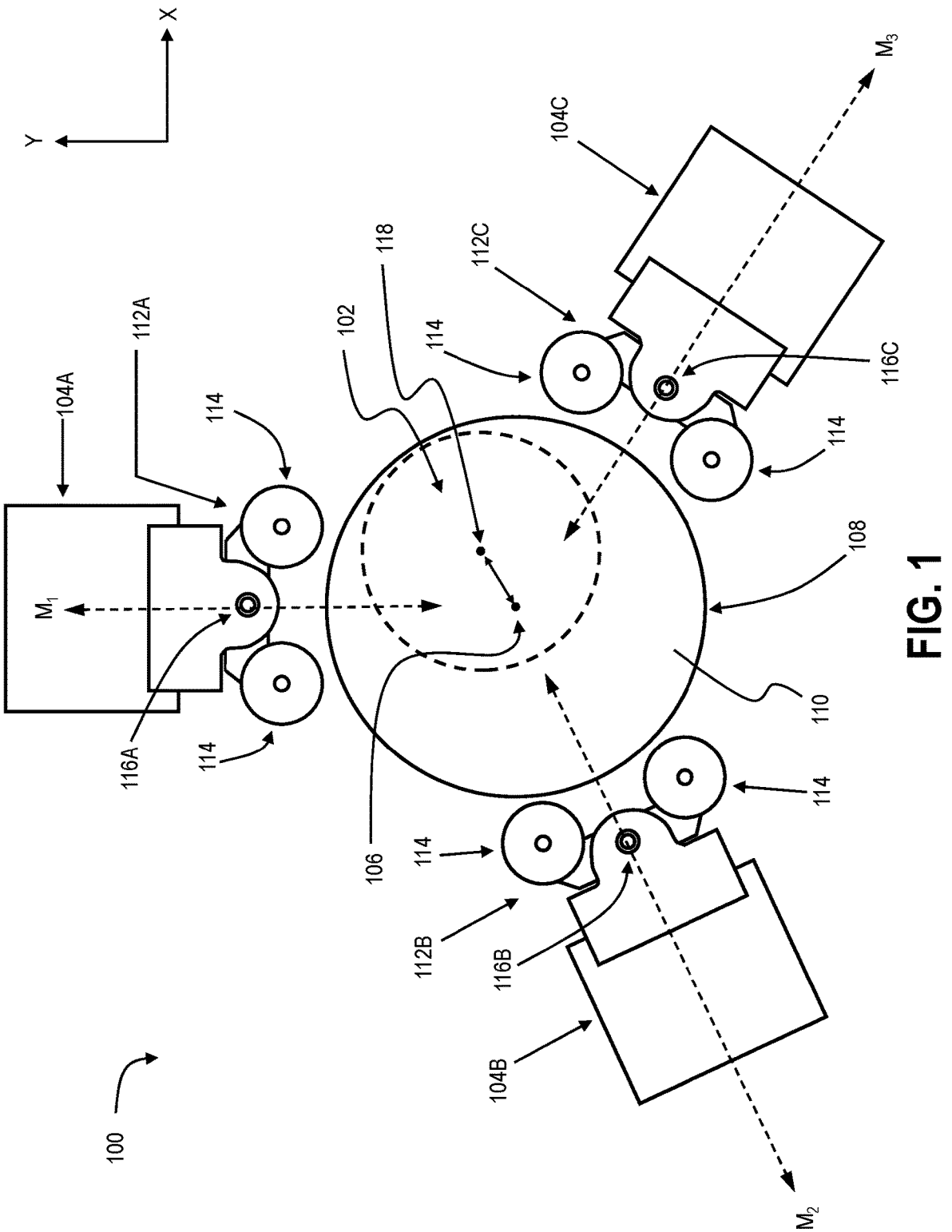
FIG. 1 is a top view schematic of a centering apparatus for centering a ware according to certain aspects of the present disclosure.

Turning to FIG. 1, a top view of a centering apparatus 100 for centering a part, component, or ware 102 is illustrated according to aspects of the present disclosure. As used herein, the terms "part," "component," and "ware" are used interchangeably to refer to an object to be aligned by the centering apparatus 100 within an associated processing system. The centering apparatus 100 can comprise one or more moveable arms 104A, 104B, 104C configured to be positioned around a central axis 106 of an associated processing system. As shown in FIG. 1, the centering apparatus 100 can comprise more than one moveable arm 104A, 104B, 104C, including at least two moveable arms 104A, 104B, 104C, at least three moveable arms 104A, 104B, 104C, and/or more than three moveable arms 104A, 104B, 104C. It should be appreciated by those of skill in the art that the associated processing systems can be variously embodied depending on the manufacturing processing step to be carried out (e.g., edge beveling, coating, etc.), but generally comprise at least a base or table 108 having a planar surface 110 for supporting the ware 102.

In embodiments, the centering apparatus 100 can comprise one or more rotatable supports 112A, 112B, 112C. Each rotatable support 112A, 112B, 112C can be secured to one of the moveable arms 104A, 104B, 104C of the centering apparatus 100. In embodiments, the centering apparatus 100 comprises at least one rotatable support 112A, 112B, 112C secured to each of the moveable arms 104A, 104B, 104C. In embodiments, the centering apparatus 100 can comprise two or more rotatable supports 112A, 112B, 112C secured to a single moveable arms 104A, 104B, 104C (as shown in FIG. 9).

In embodiments, the centering apparatus 100 can comprise a plurality of followers 114 mounted to one of the rotatable supports 112A, 112B, 112C. In embodiments, each rotatable support 112A, 112B, 112C can comprise a pair of followers 114. The followers 114 can be, for example, and without limitation, rollers.

As shown in FIG. 1, each of the moveable arms 104A, 104B, 104C can be configured to be positioned around a central axis 106 of an associated processing system, including a central axis 106 of the base 108 of an associated processing system. In embodiments, the moveable arms 104A, 104B, 104C can independently move towards and/or away from the central axis 106 along a corresponding direction $M_1$, $M_2$, $M_3$ in the XY-plane as shown in FIG. 1. As a result of moving in directions $M_1$, $M_2$, $M_3$, the plurality of followers 114 can engage and/or disengage the ware 102 for the purposes of centering and aligning the ware with the central axis 106.

Figure 2:
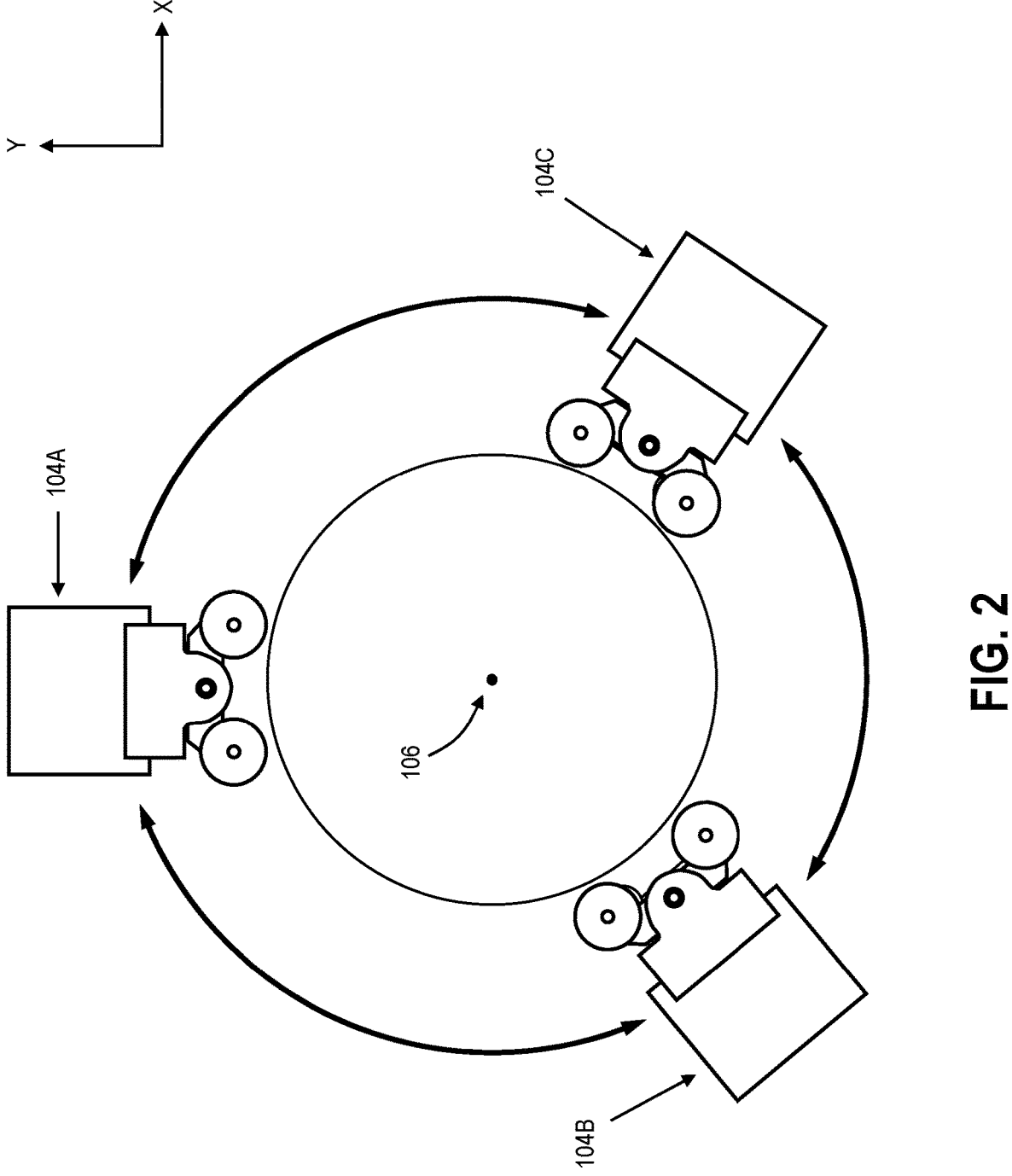
FIG. 2 is another top view schematic of a centering apparatus for centering a ware according to certain aspects of the present disclosure.

As shown in FIG. 2, the moveable arms 104A, 104B, 104C can also be configured to independently move radially around the central axis 106 in the XY-plane. In embodiments, the moveable arms 104A, 104B, 104C can be positioned at equidistant points around the central axis 106 of the associated processing system. In embodiments, the moveable arms 104A, 104B, 104C can be independently rotated and positioned around the central axis 106 in different configurations.

In embodiments, the moveable arms 104A, 104B, 104C can be rotated and positioned around the central axis 106 in any configuration so long as the followers 114 of the respective moveable arms 104A, 104B, 104C will not touch during the aligning and centering process.

Figure 3C:
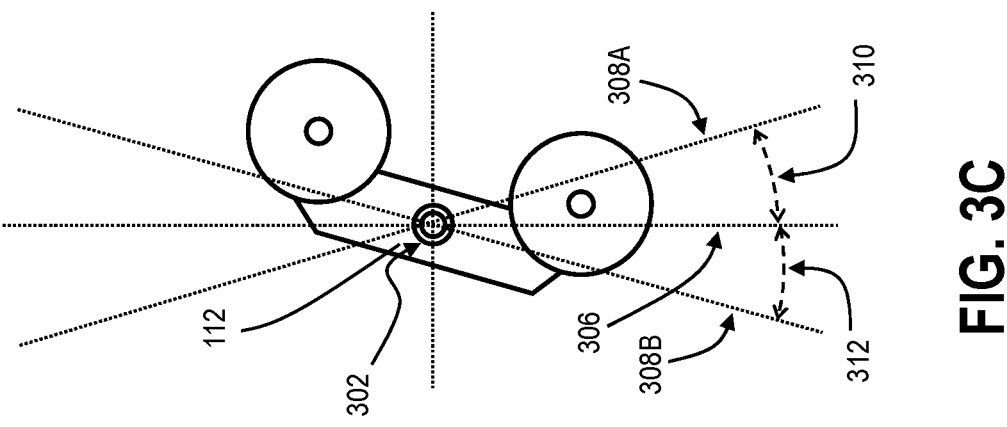
FIGS. 3A-3C are schematics of a rotatable support illustrated according to aspects of the present disclosure.
Figure 3B:
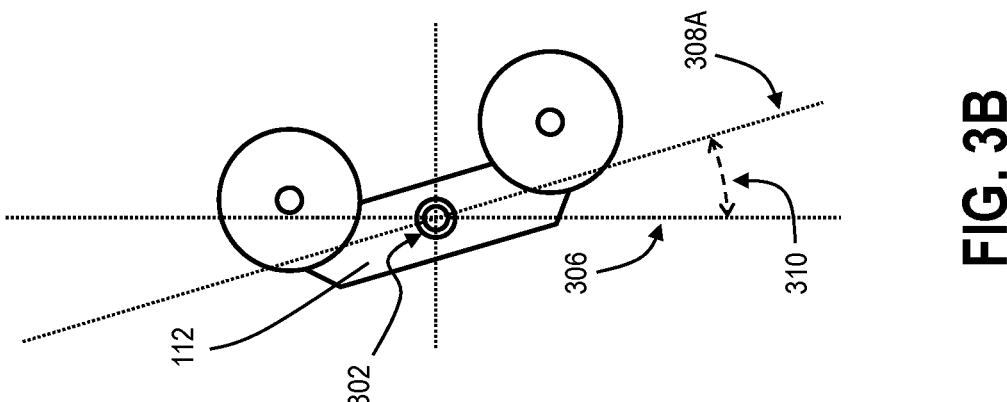
Figure 3A:
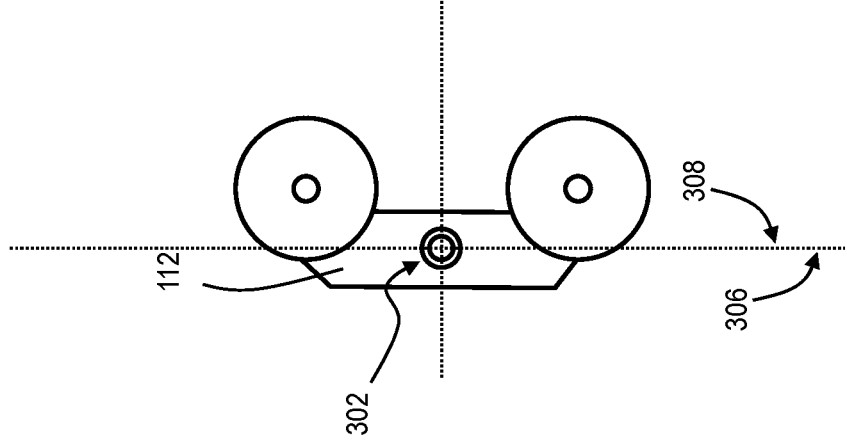

Turning to FIGS. 3A-3C, further aspects of the rotatable supports 112 (e.g., rotatable supports 112A, 112B, 112C) are illustrated and described. According to certain aspects, each rotatable support 112 can comprise a rotation axis 302 and be configured to rotate relative to its corresponding rotation axis 302. In embodiments, each rotatable support 112 can be configured to rotate independently from each other rotatable support 112 of the centering apparatus 100. That is, for example, rotatable supports 112A, 112B, 112C can each have a separate rotation axis and independently rotate about the corresponding rotation axis. As shown in FIG. 3A, the rotatable support 112 is in a neutral position with a centerline 308 that is parallel to a neutral axis 306. As shown in FIG. 3B, the rotatable support 112 has rotated in a first direction about its corresponding rotation axis 302 such that the centerline 308A forms an angle 310 with the neutral axis 306. Then, as shown in FIG. 3C, the rotatable support 112 has rotated in a second direction about its corresponding rotation axis 302 such that the centerline 308B forms an angle 312 with the neutral axis 306.

According to the present disclosure, the degree to which the rotatable support 112 may rotate about its rotation axis 302 (i.e., the sum of angle 310 and angle 312) is referred to as the mobility of the rotatable support 112. In embodiments, the rotatable support has a mobility about the corresponding rotation axis 302 of between about 1° and about 90°, including from about 5° to about 60°, from about 100 to about 30°, from about 10° to about 20°, from about 10° to about 15°, and any combination of endpoints thereof.

In embodiments, the rotation axes 302 of one or more of the rotatable supports 112 of the centering apparatus 100 can be parallel to the central axis 106 of the associated processing system. For example, as shown in FIG. 1, the rotatable supports 112A, 112B, 112C have corresponding rotation axes 116A, 116B, 116C, each of which is parallel to a central axis 106 of the associated processing system. In embodiments, one or more of the rotatable supports 112 of the centering apparatus 100 may be secured to a corresponding moveable arm 104A, 104B, 104C such that the rotation axis 302 is not parallel to the central axis 106. For example, in embodiments, the rotation axis 302 of one or more of the rotatable supports 112 of the centering apparatus 100 can be perpendicular to the central axis 106 of the associated processing system.

Figure 4:
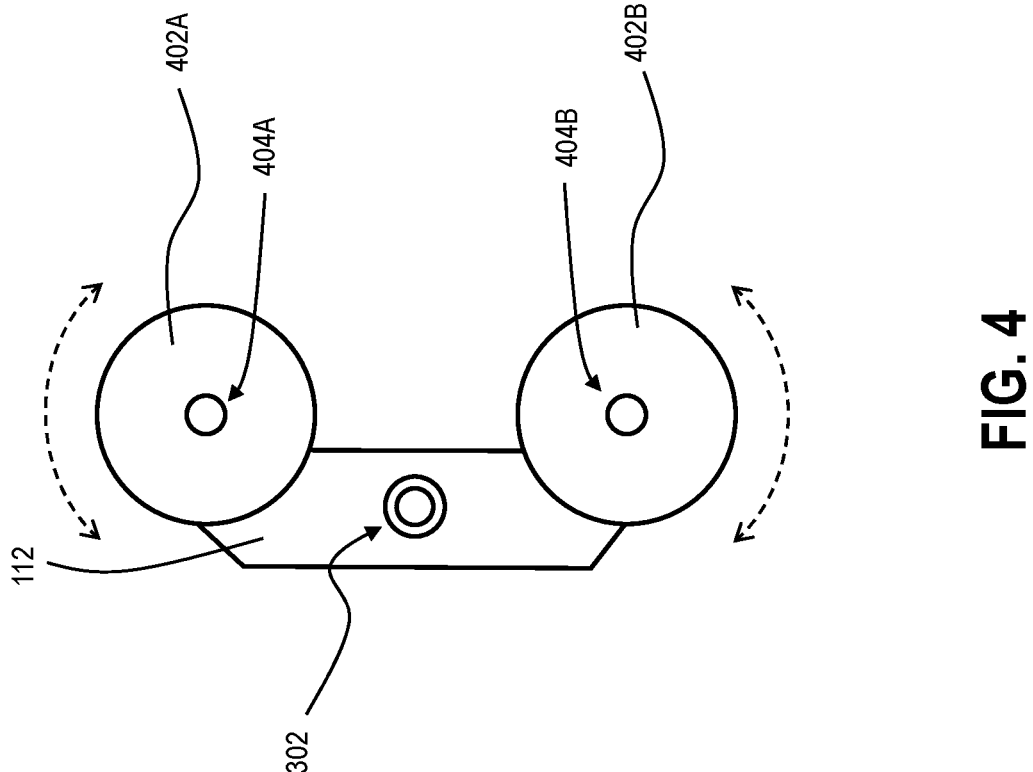
FIG. 4 is a schematic of a rotatable support illustrated according to further aspects of the present disclosure.

Turning to FIG. 4, further aspects of the plurality of followers 114 (e.g., followers 402A, 402B) mounted to the rotatable supports 112 (e.g., rotatable supports 112A, 112B, 112C) are illustrated and described. According to certain aspects, the centering apparatus 100 can comprise a plurality of followers 114 mounted to one of the rotatable supports 112. In embodiments, each rotatable support 112 can comprise a pair of followers 402A, 402B as shown in FIG. 4. Each follower 402A, 402B of the plurality of followers 114 can have a corresponding spinning axis 404A, 404B about which the follower 402A, 402B can rotate or spin. In certain aspects, the spinning axes 404A, 404B for each follower 402A, 402B mounted to a particular rotatable support 112 can be parallel with the rotation axis 302 of that rotatable support 112. Thus, in embodiments, the spinning axes 404A, 404B can be parallel with the central axis 106 of the associated processing system, or can be perpendicular with the central axis 106 of the associated processing system, depending on the orientation of the corresponding rotatable support 112, for example. In embodiments, the centering apparatus 100 can comprise at least two followers 402A, 402B with corresponding spinning axes 404A, 404B that are parallel to the central axis 106. In embodiments, the centering apparatus 100 can comprise at least two followers 402A, 402B with corresponding spinning axes 404A, 404B that are perpendicular to the central axis 106.

According to the present disclosure, the degree to which a follower 402A, 402B may rotate or spin about its spinning axis 404A, 404B is referred to as the mobility of the follower 402A, 402B. In embodiments, the follower 402A, 402B has a mobility about the corresponding spinning axis 404A, 404B of at least about 90°, including at least about 180° and at least about 270°. In embodiments, the mobility of one or more followers 402A, 402B of the plurality of followers 114 about the corresponding spinning axes 404A, 404B can be unconstrained. That is, such followers 402A, 402B can spin about their corresponding spinning axes 404A, 404B without restriction.

Figure 5:
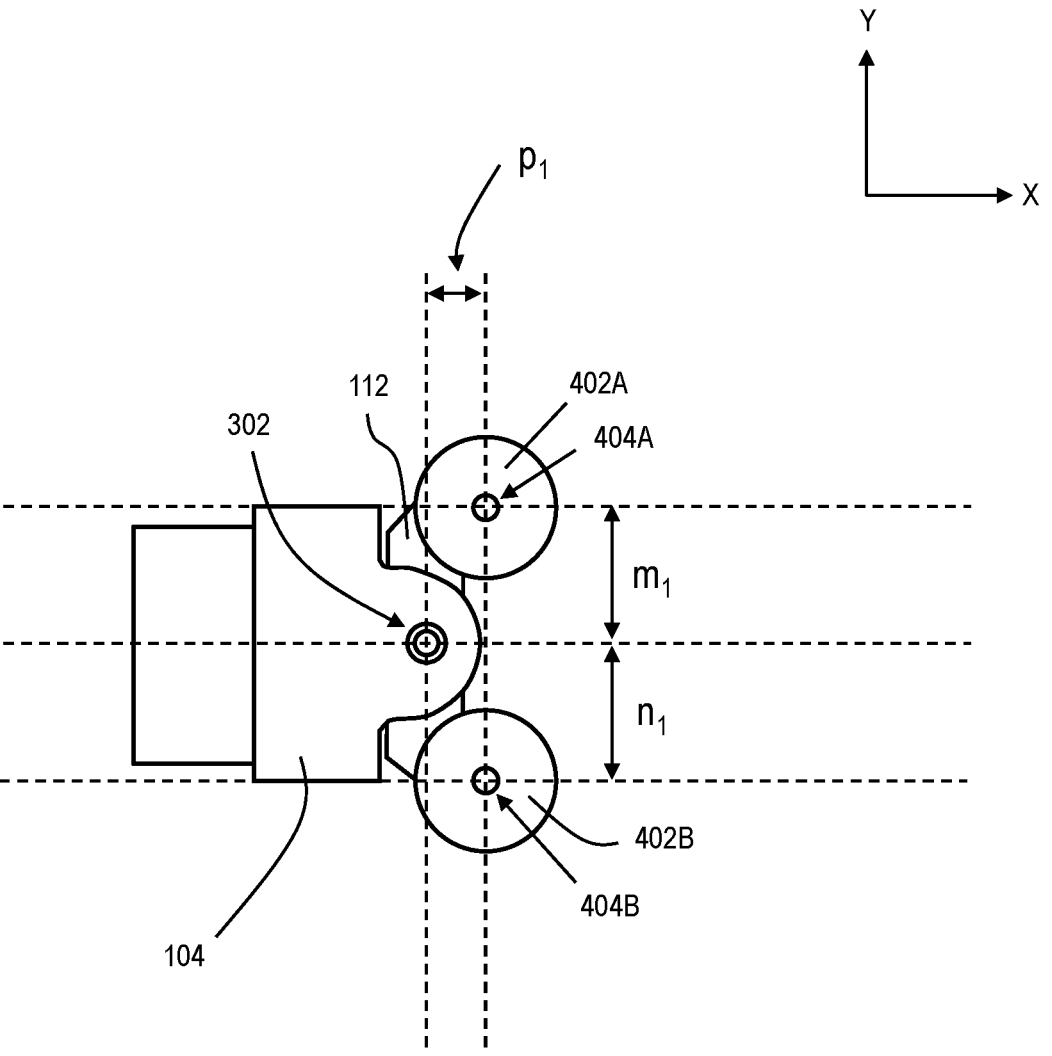
FIG. 5 is a schematic of a moveable arm illustrated according to aspects of the present disclosure.
Figure 6:
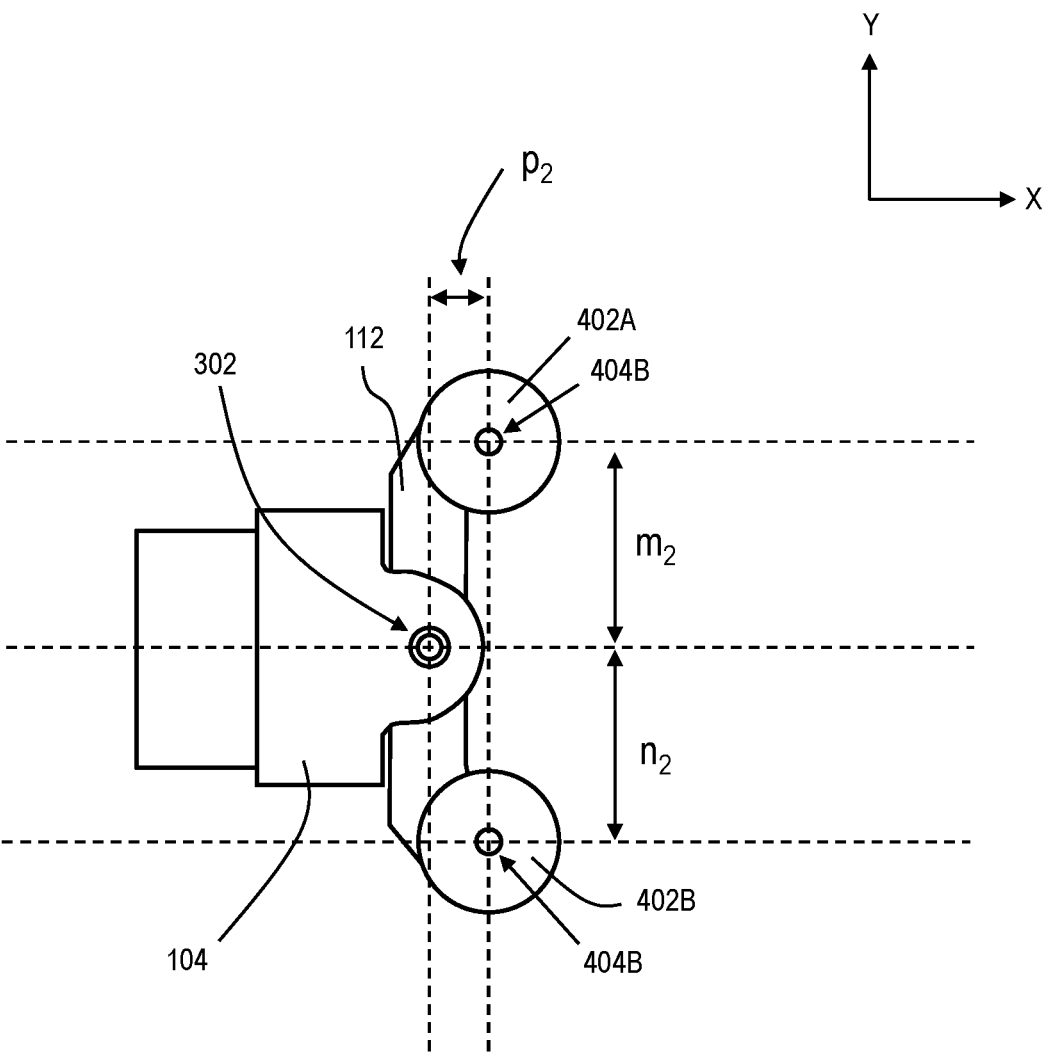
FIG. 6 is a schematic of a moveable arm illustrated according to further aspects of the present disclosure.

With reference to FIG. 5 and FIG. 6, each of the plurality of followers 114 or pairs of followers (e.g., followers 402A, 402B) can be spaced symmetrically and/or asymmetrically relative to one another and/or one or more rotational axes 302. In embodiments, the distance between the follower 402A and rotation axis 302 of the corresponding rotatable support 112 is a first distance and the distance between the follower 402B and the rotation axis 302 of the corresponding rotatable support 112 is a second distance. For example, as shown in FIG. 5, the first distance can be a distance $m_1$ in a first direction (e.g., Y-direction) and a distance $p_1$ in a second direction (e.g., X-direction), while the second distance can be a distance $n_1$ in the first direction (e.g., Y-direction) and a distance $p_1$ in a second direction (e.g., X-direction). Put another way, a first follower 402A of the rotatable support 112 can have a spinning axis 404A that is a first xy-distance (e.g., $[p_1, m_1]$) from the rotation axis 302 of the rotatable support 112, and a second follower 402B of the rotatable support 112 can have a spinning axis 404B that is a second xy-distance (e.g., $[p_1, n_1]$) from the rotation axis 302 of the rotatable support 112.

In embodiments, the rotatable supports 112 of the centering apparatus 100 can be configured to be adjustable such that the distance between the spinning axes 404A, 404B and the rotation axis 302 of the corresponding rotatable support 112 can be increased or decreased. For example, the rotatable support 112 shown in FIG. 5 can be adjusted such that the distances $m_1$, $n_1$, and $p_1$ become $m_2$, $n_2$, and $p_2$ as shown in FIG. 6, where $m_2 > m_1$, $n_2 > n_1$, and $p_2 \geq p_1$.

According to the present disclosure, the distances $m_1$, $m_2$, $n_1$, $n_2$, $p_1$, and $p_2$ can be adjusted depending on the size of the component to be aligned. In embodiments, the distances $m_1$, $m_2$, $n_1$, $n_2$, $p_1$, and $p_2$ may be greater than zero but less than 2 times the radius of the ware, including about 0.5 times the radius of the ware, between about 0.8 and 0.9 times the radius of the ware, less than about 1.1 times the radius of the ware. It should be appreciated by those of skill in the art that the relative sizes of the moveable arms 104A, 104B, 104C, rotatable supports 112A, 112B, 112C, and plurality of followers 114 (e.g., followers 402A, 402B) can be adjusted suitably depending various factors, such as the size of the component being centered. However, it should also be appreciated by those of skill in the art that the followers 402A, 402B mounted to a rotatable support 112 should not contact the followers 402A, 402B of an adjacent rotatable support 112.

Figure 7B:
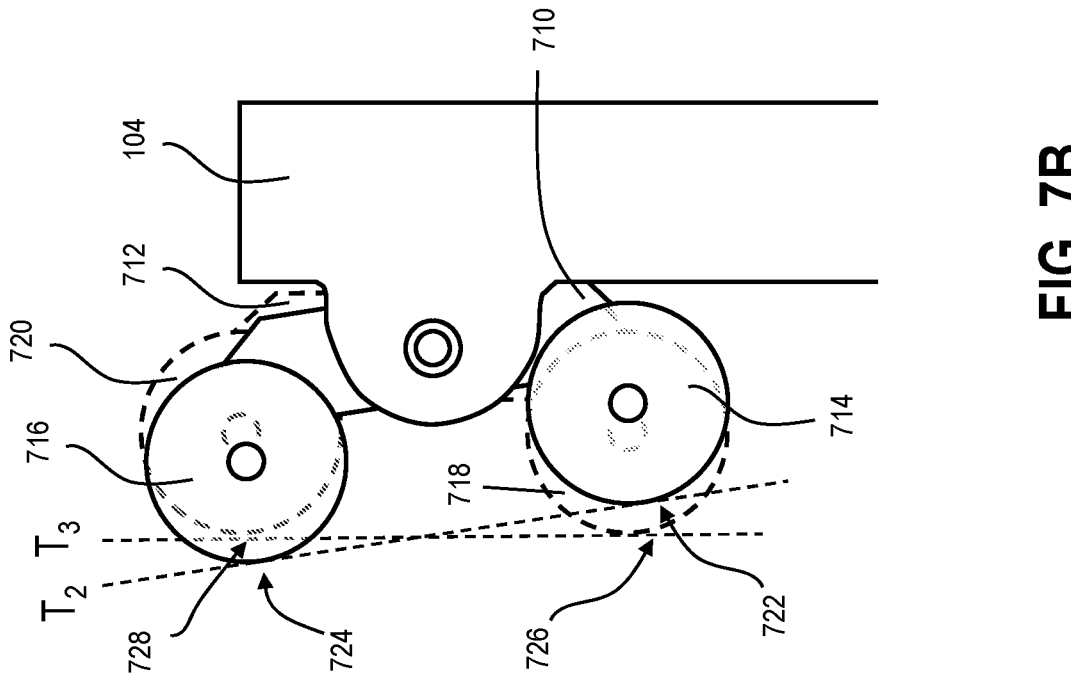
FIG. 7B is another schematic of a portion of a moveable arm illustrated according to yet further aspects of the present disclosure.
Figure 7A:
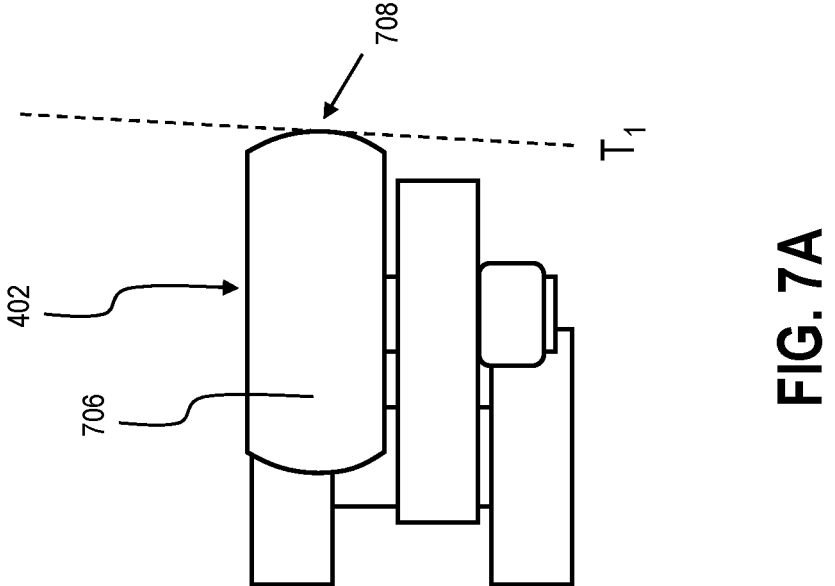
FIG. 7A is a schematic of a portion of a moveable arm illustrated according to certain aspects of the present disclosure.

With reference to FIG. 7A and FIG. 7B, each follower 402 can be circular rollers having radiused, beveled, and/or tapered sides to enable single points of contact with a surface of the ware regardless of the angle of the surface of the ware relative to the follower 402. For example, each follower, such as follower 402, can have a radiused, beveled, and/or tapered outer surface 706 such that a surface of the ware to be centered (represented by a tangent line T₁) contacts the follower 402 at a single point 708.

Similarly, where the moveable arm 104 has multiple rotatable supports 112 secured thereto (e.g., a first and second rotatable supports 710, 712), each follower 714, 716, 718, 720 can be configured to engage a surface of the ware at a single point of contact, even if the surface is not flat. For example, as shown in FIG. 7B, a first rotatable support 710 has a pair of followers 714, 716 that contact a surface of the ware (represented by a tangent line T₂) at single points 722, 724, respectively, while a second rotatable support 712 has a pair of followers 718, 720 that contact the surface of the ware (represented by a tangent line T₃) at single points 726, 728, respectively.

Figure 8:
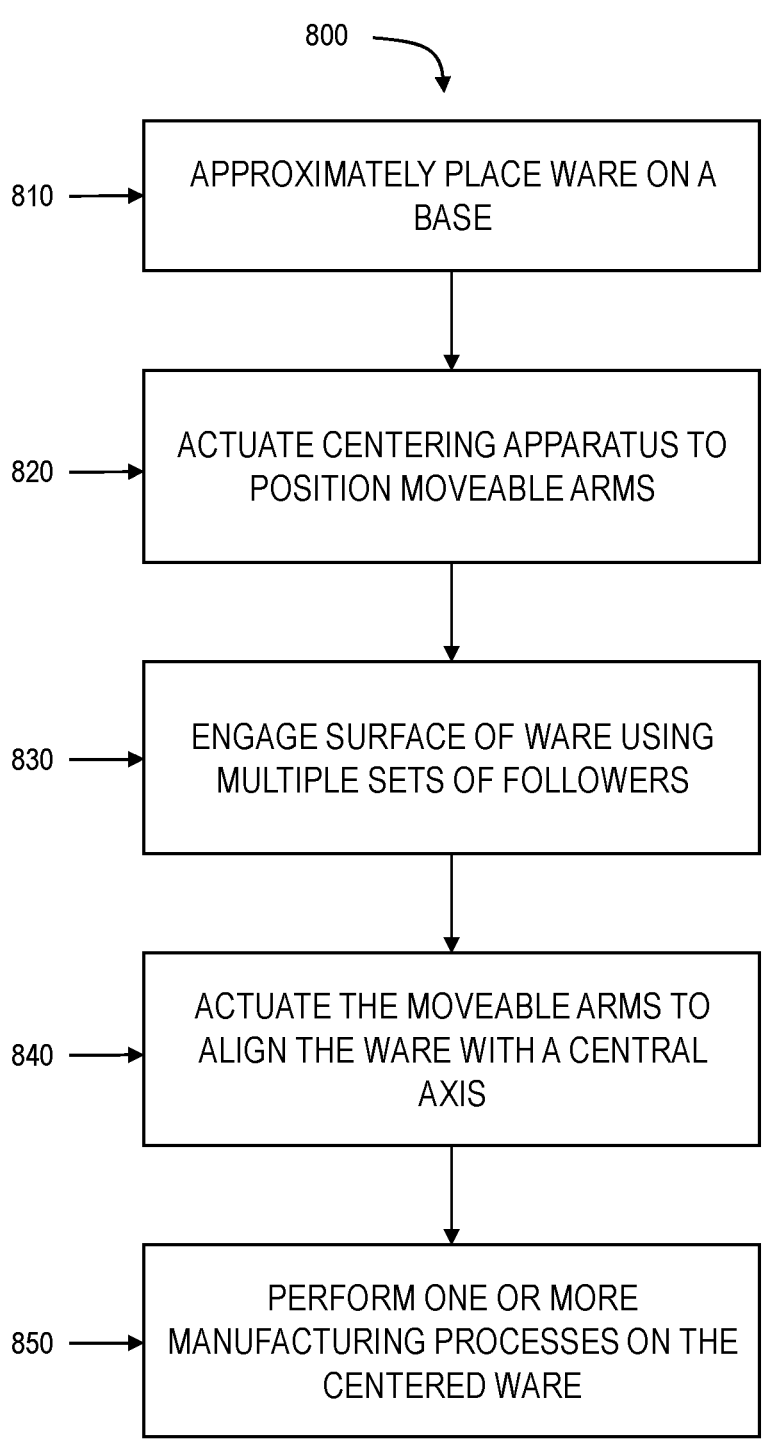
FIG. 8 is a flowchart illustrating a method of centering a component or ware on a centering apparatus according to still further aspects of the present disclosure.

Also described herein are methods of centering a component (e.g., ware 102) using a centering apparatus 100 and methods of processing a component (e.g., ware 102) that comprise centering the component. With reference to FIG. 8, a method 800 of centering a component (e.g., ware 102) using a centering apparatus 100 is illustrated. At a step 810, the method 800 comprises roughly or approximately positioning a component 102 on a base 108 of an associated processing system. At a step 820, the centering apparatus 100 is actuated to position multiple moveable arms 1004A, 104B, 104C around the component 102. As discussed above, step 820 can comprise actuating the moveable arms 104A, 104B, 104C radially around the central axis 106 of the base 108 and/or linearly relative to the central axis 106.

At a step 830, the method 800 comprises engaging the surface of the component 102 with multiple sets of followers 104. In embodiments, the step 830 can comprise: engaging, by a first set of followers 104, a first surface portion (e.g., a vertical circumferential side surface) of the component 102; engaging, by a second set of followers 104, a second surface portion (e.g., a vertical circumferential side surface) of the component 102; and engaging, by a third set of followers 104, a third surface portion (e.g., a vertical circumferential side surface) of the component 102. In an aspect, the surface portions of the component 102 can be engaged by the plurality of followers 104 by linearly actuating each of the multiple moveable arms 104A, 104B, 104C towards the central axis 106 until the followers 114 of the corresponding moveable arms 104A, 104B, 104C contact the surface of the component 102 at single points of contact.

Then, at a step 840, the method 800 comprises actuating the moveable arms 104A, 104B, 104C to align a ware axis 118 with the central axis 106 of the base 108. In embodiments, the step 840 can comprise actuating the moveable arms 104A, 104B, 104C linearly and/or radially relative to the central axis 106 until the ware axis 118 is aligned with the central axis 106.

In embodiments, the method 800 can also be a method of processing a component 102, and further comprise, at a step 850, performing one or more manufacturing processes on the centered component 102 using at least one associated processing system. As discussed above, the component or ware 102 can be a ceramic honeycomb body, such as a filter or substrate used in an exhaust system, which can be produced using an extrude-to-shape ("ETS") process. As such, the centering method 800 utilizing the centering apparatuses described herein can be component of a larger manufacturing process. Put another way, the method 800 can comprise a step 850 wherein one or more post-production processing steps (e.g., edge beveling, edge grinding, coating, inspection, etc.) after the component 102 is centered. In embodiments, the honeycomb structure can be a green honeycomb structure (i.e., un-fired), and the inspection can occur while the honeycomb structure is in this green state.

In accordance with the various aspects of the present disclosure, the centering apparatuses and centering methods described herein decrease the sensitivity of the associated processing systems to errors in the component shape, reduce the chance of damage to the component, increase centering precision, avoids bias positioning of the component due to built-in compliance, are passive and do not require adjustment or feedback after initial alignment, center the parts to within about 0.100 inch, are simple and low maintenance, and do not force out perpendicularity errors in the parts.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also comprising more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily comprising at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified.

It should also be understood that, unless clearly indicated to the contrary, in any methods claimed herein that comprise more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects can be implemented using hardware, software or a combination thereof. When any aspect is implemented at least in component in software, the software code can be executed on any suitable processor or collection of processors, whether provided in a single device or computer or distributed among multiple devices/computers.

The present disclosure can be implemented as a system, a method, and/or a computer program product at any possible technical level of integration. The computer program product can comprise a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium comprises the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some examples, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions can be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams can represent a module, segment, or portion of instructions, which comprises one or more executable instructions for implementing the specified logical function (s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant can be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples can be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A centering apparatus for centering a ware, the centering apparatus comprising:
  at least three moveable arms configured to be positioned around a central axis of an associated processing system, each moveable arm of the at least three moveable arms further configured to be actuated linearly along a path between the respective moveable arm and the central axis of the associated processing system;
  at least three rotatable supports, each rotatable support of the at least three rotatable supports secured to one of the at least three moveable arms, each rotatable support comprising a rotation axis and configured to rotate about the corresponding rotation axis;
  a plurality of followers, each follower of the plurality of followers mounted to one of the at least three rotatable supports, each follower comprising a spinning axis and configured to rotate about the corresponding spinning axis; and
  wherein the rotation axes for at least two rotatable supports of the at least three rotatable supports are parallel to the central axis of the associated processing system.

2. The centering apparatus of claim 1, wherein the at least three moveable arms are configured to be positioned at equidistant points around the central axis of the associated processing system.

3. The centering apparatus of claim 1, wherein the at least three moveable arms are configured to be actuated radially around the central axis of the associated processing system.

4. The centering apparatus of claim 1, wherein at least two followers of the plurality of followers are mounted to each rotatable support of the at least three rotatable supports.

5. The centering apparatus of claim 4, wherein for each rotatable support of the at least three rotatable supports:
  a first follower is secured to a corresponding rotatable support and has a spinning axis that is a first xy-distance from the rotation axis of the corresponding rotatable support;
  a second follower is secured to the corresponding rotatable support and has a spinning axis that is a second xy-distance from the rotation axis of the corresponding rotatable support; and
  the first xy-distance is equal to the second xy-distance.

6. The centering apparatus of claim 5, wherein each rotatable support of the at least three rotatable supports is adjustable such that the first xy-distance and the second xy-distance can be increased or decreased.

7. The centering apparatus of claim 1, wherein each follower of the plurality of followers is radiused, beveled, and/or tapered to enable a single point of contact with a surface of the ware.

8. The centering apparatus of claim 1, wherein each rotatable support of the at least three rotatable supports comprises a mobility about the corresponding rotation axis of between about 1° and about 90°.

9. The centering apparatus of claim 1, wherein each follower of the plurality of followers comprises a mobility about the corresponding spinning axis of at least about 180°.

10. The centering apparatus of claim 8, wherein each follower of the plurality of followers comprises a mobility about the corresponding spinning axis that is unconstrained.

11. The centering apparatus of claim 1, wherein the spinning axis for each follower of the plurality of followers is parallel to the central axis of the associated processing system.

12. The centering apparatus of claim 1, wherein the plurality of followers and the at least three moveable arms are configured to constrain movement of the ware when the ware is centered in three degrees of freedom comprising translation in an x-axis direction, translation in a y-axis direction, and rotation about a z-axis direction.

13. The centering apparatus of claim 1, wherein the at least three moveable arms are coupled together and connected to a mount for supporting the ware for centering.

14. A method of processing a ware, the method comprising:
  centering the ware on a base of a mount using a centering apparatus, the centering apparatus comprising:
    at least three moveable arms positioned around a central axis of an associated processing system;
    at least three rotatable supports, each rotatable support of the at least three rotatable supports secured to one of the at least three moveable arms, each rotatable support comprising a rotation axis and rotatable about the corresponding rotation axis;
    a plurality of followers, each follower of the plurality of followers mounted to one of the at least three rotatable supports, each follower comprising a spinning axis and configured to rotate about the corre-
    sponding spinning axis; and
edge beveling the centered ware.

* * * * *